Figure 1:
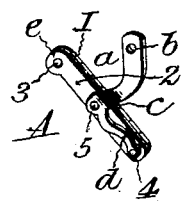

No. 710,594. Patented Oct. 7, 1902.
E. B. MEYROWITZ.
EYEGLASS NOSE GUARD.
(Application filed Apr. 18, 1901.)

(No Model.)

Witnesses
C. H. Walker.
E. Thos. Loftus.

Inventor
Emil B. Meyrowitz
By
Attorney

THE NORRIS PETERS CO., PHOTO-LITHO., WASHINGTON, D. C.

UNITED STATES PATENT OFFICE.

EMIL B. MEYROWITZ, OF NEW YORK, N. Y., ASSIGNOR TO THE MEYROWITZ MANUFACTURING COMPANY, OF NEW YORK, N. Y., A CORPORATION OF NEW JERSEY.

EYEGLASS NOSE-GUARD.

SPECIFICATION forming part of Letters Patent No. 710,594, dated October 7, 1902.

Application filed April 18, 1901. Serial No. 56,370. (No model.)

*To all whom it may concern:*

Be it known that I, EMIL B. MEYROWITZ, a citizen of the United States of America, and a resident of the city of New York, in the State of New York, have invented a new and useful Improvement in Eyeglass Nose-Guards, of which the following is a specification.

This invention relates to eyeglasses, and has special reference to the means for retaining eyeglasses upon the nose of the wearer. The devices commonly used for this purpose are known as the "guards" and the "bow-spring," the latter pressing the guards against the opposite sides of the nose, which thereby act as clamps. The guard is usually faced with shell, cork, or other similar holding material. In order that the guard may take hold of the nose at the proper place, it is often necessary to offset the guard from the post or frame to which it is ordinarily attached and to position the guard at more or less of an angle to the plane of the lenses. One of the most common forms of guard is merely an elongated narrow plate, which affords large bearing-surface and at the same time can be readily set at any desired angle to the lenses. In order to offset this form of guard from the post, it is necessary to connect it with the post by a supporting-arm, and this arm naturally occupies an angular position with respect to the guard. If this supporting-arm could itself be used as a guard, it would materially aid the main guard in holding the glasses on the nose, because, owing to its angular position with respect to the main guard, it would serve as a brace or steadying element, the contact against the nose being then along two intersecting lines instead of along the one line of the guard. It is the object of my invention to utilize this supporting-arm of the guard as a steadying element in aid of the main guard; but in order to do this without sacrificing the adjustability desirable in the arm I leave the face of the arm naked— *i. e.*, I omit the shell facing—and make the arm of malleable material, so that its shape and direction can be readily determined by the aid of the pliers.

Broadly considered, my invention therefore consists in the combination, with a guard provided with the usual shell or other bearing-surface, of a supporting-arm connecting the guard with the post or eyeglass-frame, said arm being so shaped and directed as to bear against the nose throughout substantially its entire length. To carry out this idea, it is necessary, among other things, to offset the supporting-arm at the point where it joins the metallic portion of the main guard in order to bring the surface of the arm into line with the surface of the shell or other bearing material on the main guard. It is also necessary to give such a direction to the arm that it will continue in contact with the side of the nose until it enters or engages the post.

I am aware that guards have been made heretofore which were supported from the post by an arm and which arm was offset to form a seat at its extremity for the guard; but such offset was not for the purpose of bringing the arm into contact with the nose, nor could such contact have been obtained unless the direction of the arm was made to agree with the shape of the nose. As a matter of fact such arms as have been used heretofore were merely connectors between the guard and the post, and their offset was solely for the purpose of seating the guard in the arm or directing the latter properly to the post, and hence possessed neither the function nor the construction of my improved guard.

The accompanying drawings illustrate my improved guard.

Figure 4:
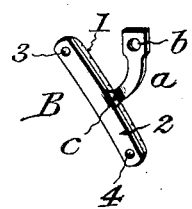
Figure 2:
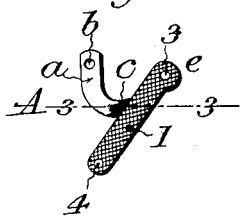
Figure 5:
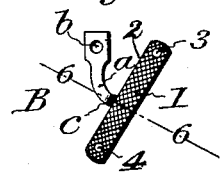
Figure 7:
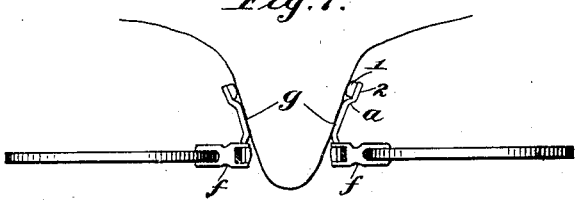
Figure 3:
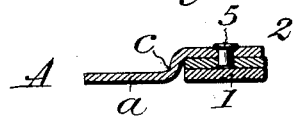
Figure 6:

Figure 1 is a perspective back view of a "pivot-guard" made according to my Patent No. 572,306, dated December 1, 1896, and provided with the present improvement. Fig. 2 is a face view of the same. Fig. 3 represents an enlarged section on the line 3 3 of Fig. 2. Fig. 4 is a perspective back view of another form of nose-guard embodying the improvement. Fig. 5 is a face view thereof. Fig. 6 is an enlarged section on the line 6 6 of Fig. 5, and Fig. 7 is a plan showing the position of the glasses and my improved guard upon the nose.

The two forms of nose-guards illustrated are indicated by A and B, respectively. The guard proper consists of the metallic elongated plate 2, having fixed to its front face a strip of shell, cork, or other holding material 1, which is held thereto by means of rivets 3 and 4 or in any other manner. This guard is supported from the usual posts $f$, which carry the lenses, by means of an arm $a$, one end of the arm having a hole $b$ for the passage of a screw, which enters the post, and the other end leading to and connecting with the metallic portion of the guard at any point along its length. The arm may be either integrally connected with the metallic part of the guard or it may be fastened thereto by the rivet 5 or in any other manner. At all events the arm serves as the connecting-link between the post and the guard and stands at an angle with the guard throughout all or a portion of its length. The guard is by means of this arm $a$ offset from the post and thrown out of the plane of the lenses. It may also be made to occupy any position with respect to such plane by changing the angle between the arm and the guard. To furnish a steadying element in connection with the guard, I shape and direct the arm $a$ in such a manner that it will bear against the nose throughout nearly its entire length from the point where it is attached to the guard to the post. A portion of this shaping consists in offsetting that part of the arm closely adjacent to the guard, as shown at $c$, so as to bring it flush with the face of the shell or bearing-surface on the guard, and from this point the arm is so shaped as to remain in contact with the nose until it enters the post $f$, as clearly shown at $g$, Fig. 7. In some cases it may be necessary to curve the arm $a$ so that its bearing-surface will follow the surface of the nose, and in order to readily make these adjustments I prefer not to use shell or other bearing material upon the arm, but leave the same naked and use malleable or pliable metal which will retain any shape given to it by the pliers.

Having described my invention, I claim—
1. In eyeglasses, a guard consisting of a plate having attached to it suitable material affording a bearing-surface, in combination with a naked supporting-arm by which the guard is attached to the glasses, said arm being of malleable metal and conforming in shape with, and adapted to bear against the nose throughout substantially its entire length.

2. In eyeglasses, a guard consisting of an elongated plate having attached to it suitable material affording a bearing-surface, in combination with a naked supporting-arm by which the guard is attached to the glasses, said arm being of malleable metal and occupying an angular position with respect to the plate and conforming in shape with, and adapted to bear against the nose throughout its entire length.

EMIL B. MEYROWITZ.

Witnesses:
JEAN SCHMIDT,
DAVID K. UTTA.